United States Patent
Tchorny et al.

(10) Patent No.: US 7,445,411 B2
(45) Date of Patent: Nov. 4, 2008

(54) ROTARY CUTTING TOOL

(75) Inventors: Dmitri Tchorny, Maalot (IL); Dov Yoffe, Kiryat Haim (IL)

(73) Assignee: Iscar Ltd. (IL)

( * ) Notice: Subject to any disclaimer, the term of this patent is extended or adjusted under 35 U.S.C. 154(b) by 332 days.

(21) Appl. No.: 11/364,257

(22) Filed: Feb. 28, 2006

(65) Prior Publication Data

US 2006/0222470 A1 Oct. 5, 2006

(30) Foreign Application Priority Data

Mar. 29, 2005 (IL) .................................. 167728

(51) Int. Cl.
*B23B 51/08* (2006.01)
(52) U.S. Cl. .................. 408/224; 408/57; 408/230; 408/233; 409/136
(58) Field of Classification Search ............... 408/56, 408/57, 224, 228–230, 233; 409/135, 136
See application file for complete search history.

(56) References Cited

U.S. PATENT DOCUMENTS

| | | | | |
|---|---|---|---|---|
| 3,389,621 A | * | 6/1968 | Wear | 408/83 |
| 3,940,214 A | | 2/1976 | Waschek | |
| 4,224,846 A | * | 9/1980 | Eysel et al. | 82/158 |
| 4,941,782 A | * | 7/1990 | Cook | 408/147 |
| 5,331,775 A | * | 7/1994 | Carmichael et al. | 451/51 |
| 5,865,573 A | * | 2/1999 | Kress | 408/57 |
| 6,270,295 B1 | | 8/2001 | Hyatt et al. | |
| 6,536,998 B2 | * | 3/2003 | Hyatt et al. | 408/147 |
| 6,729,810 B2 | * | 5/2004 | Hyatt et al. | 408/1 R |
| 6,779,953 B2 | * | 8/2004 | Suzuki et al. | 408/147 |
| 2005/0220550 A1 | | 10/2005 | Beier | |

FOREIGN PATENT DOCUMENTS

JP 11156612 6/1999

OTHER PUBLICATIONS

International Search Report, PCT/IL2006/000340 dated Jul. 25, 2006.

* cited by examiner

*Primary Examiner*—David P. Bryant
*Assistant Examiner*—Eric A Gates
(74) *Attorney, Agent, or Firm*—Womble Carlyle

(57) ABSTRACT

A rotary cutting tool having a cutting insert slidably supported therein. The cutting insert is moveable from a retracted position to an extended position by means of a pressurized fluid which bears directly against the cutting insert.

13 Claims, 3 Drawing Sheets

ROTARY CUTTING TOOL

FIELD OF THE INVENTION

The present invention relates to a rotary cutting tool having a cutting insert for deburring of bores.

BACKGROUND OF THE INVENTION

Such rotary cutting tools are known either in the form of stand alone tools for deburring ready made holes or in the form of drills having incorporated deburring capability. In both cases the deburring is generally performed by a spring-loaded cutting insert. However, there are situations in which there is not enough room for a spring. This can be the case for very small diameter cutting tools or in drills where it is required to locate the deburring insert in the vicinity of the drill's flutes.

U.S. Pat. No. 6,270,295 describes a cutting tool which utilizes pressurized fluid for indirectly loading a blade. In the '295 patent, a piston 118 resides in a side conduit 112 and pressurized fluid, flowing in the side conduit 112, assists in pushing the piston 118 against a cartridge 122 which holds a blade 126.

SUMMARY OF THE INVENTION

In accordance with one aspect of the present invention, there is provided a rotary cutting tool having a longitudinal axis of rotation and comprising:

a conduit, for passage of fluid, formed in the cutting tool and extending generally axially, an insert pocket opening out to a peripheral surface of the cutting tool via an aperture, the insert pocket communicating with the conduit, and a cutting insert slidably retained in the insert pocket, the cutting insert being slidable from a retracted position to an extended position by means of fluid pressure applied by the fluid which bears against and biases the cutting insert towards the extended position, wherein in the extended position at least a portion of the cutting insert protrudes from the aperture beyond the peripheral surface of the cutting tool.

Preferably, a holding bore opens out to the peripheral surface and communicates with the insert pocket.

Typically, the cutting insert has an insert axis defining a back to front direction and a plane including the insert axis passes there through, the cutting insert comprising:

a body portion having a back surface at a back end of the body portion, and a cutting portion at a front end of the body portion, the cutting portion having two cutting edges being reflection symmetric with respect to the plane.

Generally, the pressurized fluid bears directly against the back surface of the cutting insert.

Preferably, a holding member is located in the holding bore and abuts the cutting insert when the cutting insert is in the extended position.

If desired, the rotary cutting tool is a drill.

In another aspect, the present invention is directed to a rotary cutting tool having a longitudinal axis of rotation and comprising:

a conduit, for passage of fluid, formed in the cutting tool and extending generally axially, an insert pocket opening out to a peripheral surface of the cutting tool via an aperture, the insert pocket communicating with the conduit, and a cutting insert slidably retained in the insert pocket, the cutting insert being slidable from a retracted position to an extended position in which at least a portion of the cutting insert protrudes from the aperture beyond the peripheral surface of the cutting tool; wherein:

a back surface of the cutting insert is in communication with the conduit such that a fluid present in the conduit is capable of urging the cutting insert from the retracted position to the extended position, without the assistance of a spring.

Such a rotary cutting tool may be a drill.

In another aspect, the present invention is directed to employing such a drill in accordance with the present invention to drill a hole in a workpiece while passing fluid through the conduit such that said fluid applies pressure to the back surface of the cutting insert and causes the cutting insert to slide towards the extended position. The fluid may exit the drill through a minor portion of the conduit that extends outwardly, thereby cooling the workpiece.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
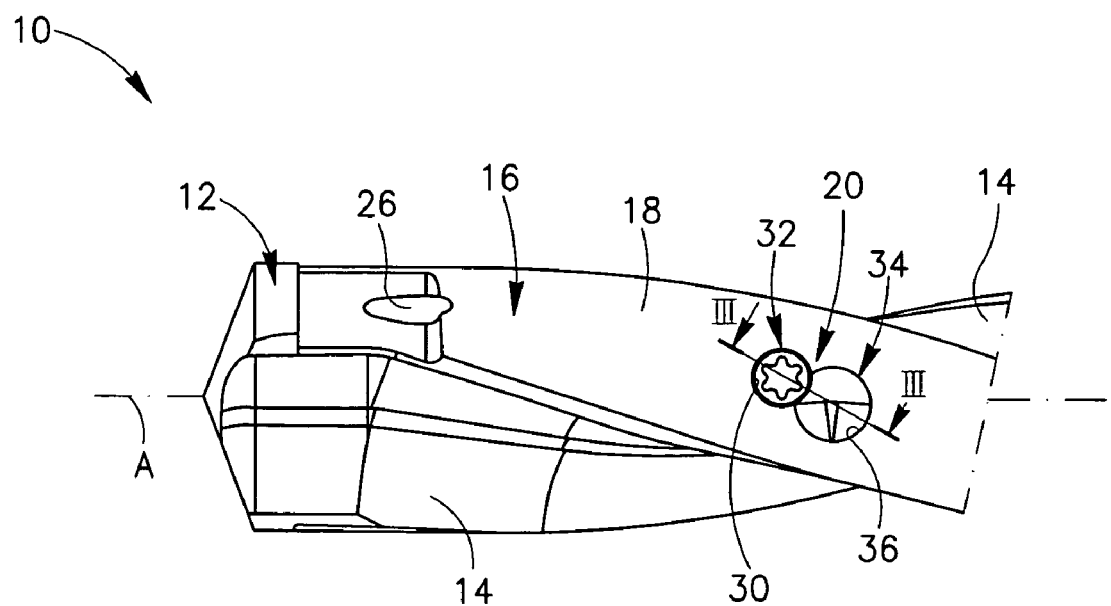
FIG. 1 is a partial first side view of a drill having a deburring mechanism in accordance with the present invention.

Attention is first drawn to FIG. 1. The present invention will be described from herein with reference to a drill 10 however it will be clear to the skilled person in the art that it can be applicable to a variety of rotary cutting tools where deburring is required. The drill 10 has a longitudinal axis of rotation A defining a forward to rear direction and a cutting tip 12 located at a forward end thereof. Two flutes 14, extending rearwardly from the cutting tip 12 along a peripheral surface 16 of the drill 10, form two identical lands 18 therebetween. A deburring mechanism 20 in accordance with the present invention is formed on one of the lands 18 adjacent the cutting tip 12. It should be noted that directional terms appearing throughout the specification and claims, e.g. "forward", "rear", "front", "back", etc., are used as terms of convenience to distinguish various surfaces relative to each other. Although these terms may be meaningful with reference to particular component orientations, they are used for illustrative purposes only, and are not intended to limit the scope of the appended claims.

Figure 2:
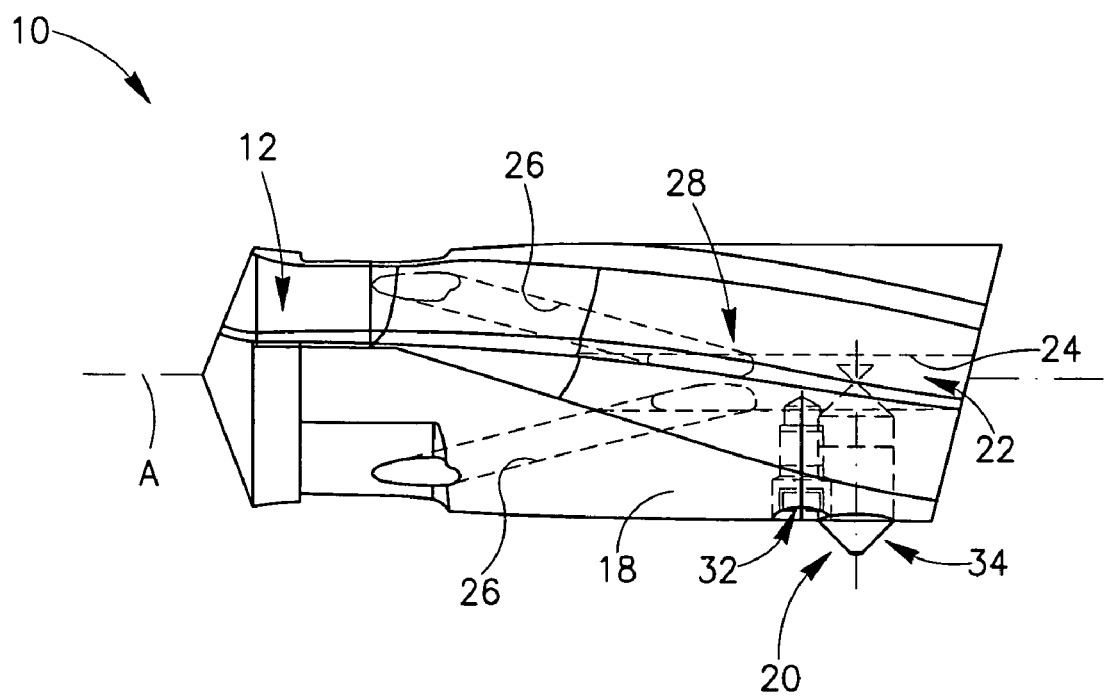
FIG. 2 is a partial second side view of the drill with its conduit and deburring mechanism shown in hidden lines.

Attention is additionally drawn to FIG. 2. A conduit 22 for the passage of fluid, having a main portion 24 and two minor portions 26, is formed in the drill 10. The main portion 24 extends forwardly along the axis of rotation A to a forward ending 28 adjacent the cutting tip 12. Each minor portion 26 diverges forwardly and outwardly from the forward ending 28 to a respective land 18.

The deburring mechanism 20 includes a holding bore 30, a holding member 32 and a cutting insert 34 that is capable of lateral movement between a retracted position and an extended position in a generally cylindrical insert pocket 36. As will be described in greater detail below, the cutting insert 34 is prevented from exiting the insert pocket 36 by means of the holding member 32, and is loaded in the insert pocket 36 by means of fluid pressure which bears directly against the cutting insert 34 at one of its ends.

Figure 4:
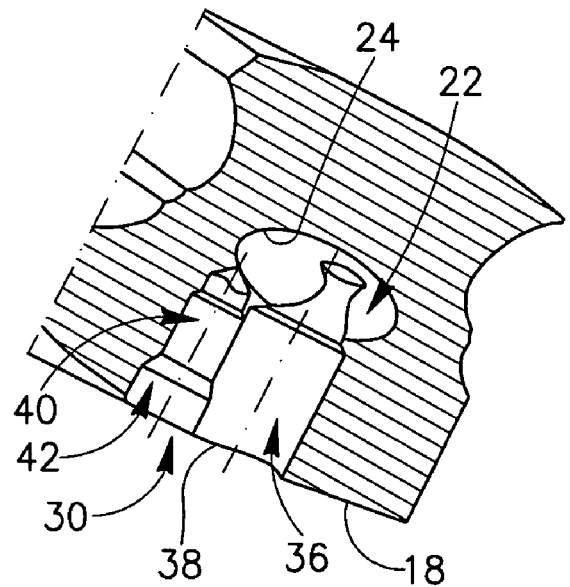
FIG. 4 is similar to FIG. 3 but with a cutting insert and holding member removed.
Figure 5:
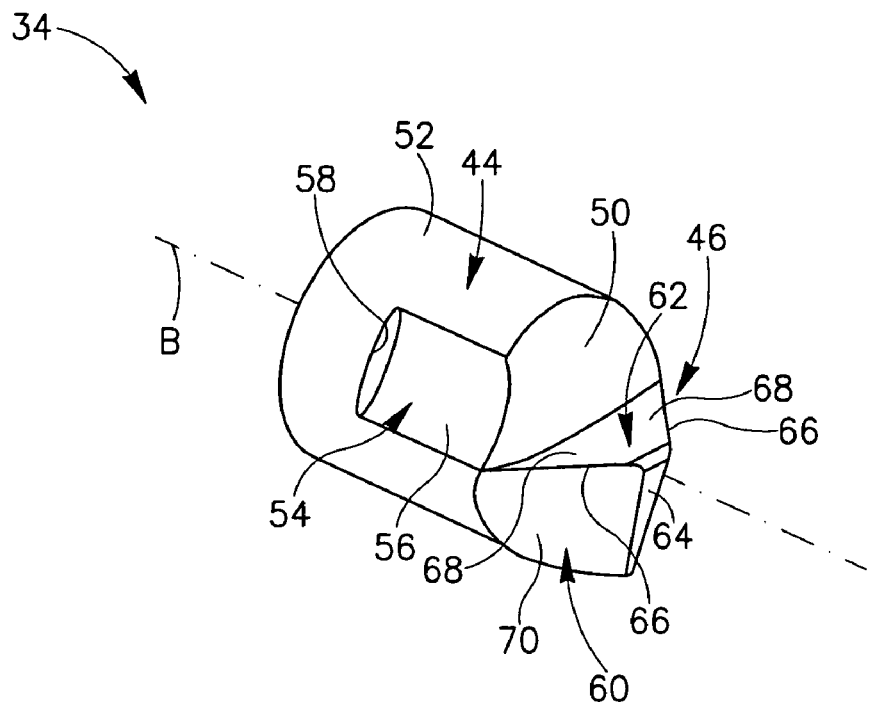
FIG. 5 is a perspective view the cutting insert in accordance with the present invention.
Figure 6:
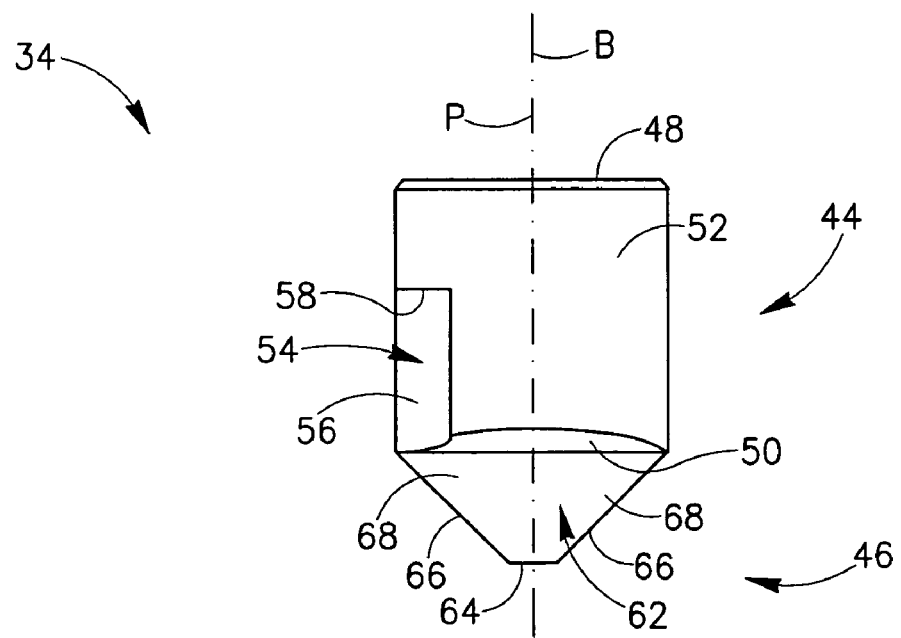
FIG. 6 is a top view of the cutting insert shown in FIG. 5.

Attention is drawn to FIGS. 4 to 6. The insert pocket 36 communicates with the main portion 24 of the conduit 22 and opens out to the land 18 via an aperture 38. The holding bore 30 is formed in the land 18 adjacent the insert pocket 36 and has a threaded portion 40 and a socket 42. The socket 42 extends outwardly from the threaded portion 40 and opens out to the land 18.

The cutting insert 34 has an insert axis B defining a front to back direction and comprises a generally cylindrical body portion 44 and a cutting portion 46. The body portion 44 has a back surface 48 at a back end, a front surface 50 at a front end and a peripheral body surface 52 therebetween. A plane P which includes the insert axis B divides the cutting insert 34 into two sides. A holding recess 54 having a recess face 56 and a back face 58 is formed on the peripheral body surface 52, on one side of the cutting insert 34, and opens out to the front surface 50. The recess face 56 has a concave arc shape in a cross section perpendicular to insert axis B and the back face 58 is located at a back end of the holding recess 54 and is perpendicular to the insert axis B. The cutting portion 46 has opposing flank surfaces 60 and a top surface 62 which all extend forwardly from the front surface 50 of the body portion 44 to an insert nose 64. The flank surfaces 60 are located on opposing sides of the plane P. The top surface 62 bridges between the flank surfaces 60, is generally perpendicular to the plane P and proximate to the insert axis B. The cutting portion 46 has two cutting edges 66 located each between the top surface 62 and a respective flank surface 60. The cutting edges 66 are reflection symmetric with respect to the plane P and have each a rake surface 68 associated with the top surface 62 and a relief surface 70 associated with the respective flank surface 60.

Figure 3:
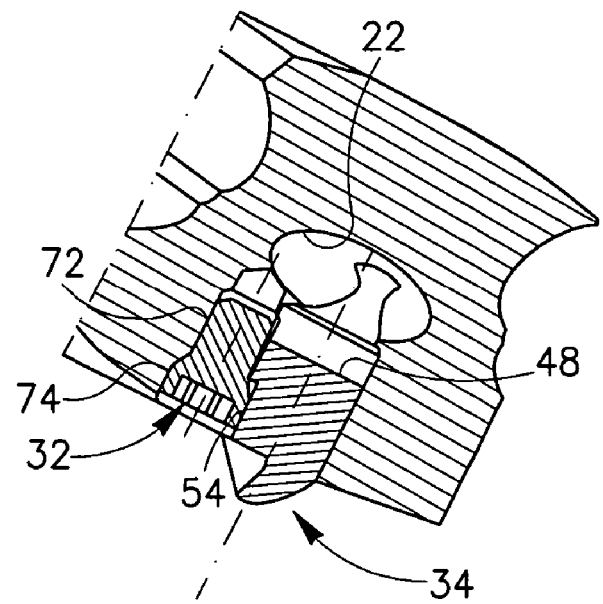
FIG. 3 is a cross sectional view of the deburring mechanism taken along the line III-III in FIG. 1.

Attention is additionally drawn to FIG. 3. The cutting insert 34 is located in the insert pocket 36 with its back surface 48 facing inwardly. The holding member 32 has a screw portion 72 and a head 74 which are, respectively, threadingly received in the threaded portion 40 and located in the socket 42 of the holding bore 30. The head 74 of the holding member 32 protrudes into the insert pocket 36 and, when the cutting insert 34 is in the extended position, abuts at least a portion of the back face 58 of the holding recess 54. Rotation of the cutting insert 34 in a given direction around the insert axis B is limited in the insert pocket 36 by the head 74 of the holding member 32 abutting against the recess face 56 of the holding recess 54. Loading of the cutting insert 34 in the insert pocket 36 is provided by fluid that flows through the conduit 22 and into the insert pocket 36.

The fluid pressure that is formed in the insert pocket 36 bears against the back surface 48 of the cutting insert 34 forming a force which biases and urges the cutting insert 34 radially outwardly. In other words, the back surface 48 of the cutting insert 34 is in communication with the conduit 22 such that a fluid present in the conduit 22 is capable of urging the cutting insert from the retracted position to the extended position, without the assistance of a spring. After fluid passes through the main portion 24, it exits through the minor portions 26. Thus, one may use the present tool to drill a workpiece while passing fluid through the conduit 22 such that the fluid applies pressure to the back surface 48 of the cutting insert 34 and causes the cutting insert 34 to slide towards the extended position, the fluid exiting the drill through a minor portion 26 of the conduit that extends outwardly. The exiting fluid thus cools the workpiece in which a hole is being drilled and deburred.

A device in accordance with the present invention potentially provides a number of features. First, it may allow for biasing the deburring insert without complex mechanisms or springs. Second, the deburring insert can be incorporated in a drill in the vicinity of the drill's flutes. Third, the deburring insert can be incorporated in small diameter tools in which there is insufficient room for springs, or the like. Finally, the deburring insert may be loaded at the forward end of a drill to drill through holes and deburr both sides of the hole.

Although the present invention has been described to a certain degree of particularity, it should be understood that various alterations and modifications could be made without departing from the scope of the invention as hereinafter claimed.

What is claimed is:

1. A rotary cutting tool having a longitudinal axis of rotation and comprising:
   a conduit, for passage of fluid, formed in the cutting tool and extending generally axially,
   an insert pocket opening out to a peripheral surface of the cutting tool via an aperture, the insert pocket communicating with the conduit,
   a cutting insert slidably retained in the insert pocket, the cutting insert being slidable from a retracted position to an extended position by means of fluid pressure applied by the fluid which bears against and biases the cutting insert towards the extended position, wherein in the extended position at least a portion of the cutting insert protrudes from the aperture beyond the peripheral surface of the cutting tool; and
   a threaded holding member configured to prevent the cutting insert from exiting the insert pocket and limit rotation of the cutting insert around an insert axis (B) of the cutting insert.

2. The rotary cutting tool according to claim 1, wherein a holding bore opens out to the peripheral surface and communicates with the insert pocket.

3. The rotary cutting tool according to claim 2, wherein the holding member is located in the holding bore and abuts the cutting insert, when the cutting insert is in the extended position.

4. The rotary cutting tool according to claim 1, wherein the cutting insert has an insert axis defining a back to front direction and a plane including the insert axis passes therethrough, the cutting insert comprising:
   a body portion having a back surface at a back end of the body portion, and
   a cutting portion at a front end of the body portion, the cutting portion having two cutting edges being reflection symmetric with respect to the plane.

5. The rotary cutting tool according to claim 4, wherein the pressurized fluid bears directly against the back surface of the cutting insert.

6. The rotary cutting tool according to claim 1, wherein the rotary cutting tool is a drill.

7. A rotary cutting tool having a longitudinal axis of rotation and comprising:
   a conduit, for passage of fluid, formed in the cutting tool and extending generally axially,
   an insert pocket opening out to a peripheral surface of the cutting tool via an aperture, the insert pocket communicating with the conduit, a cutting insert slidably retained in the insert pocket, the cutting insert being slidable from a retracted position to an extended position in which at least a portion of the cutting insert protrudes from the aperture beyond the peripheral surface of the cutting tool; and a threaded holding member configured to prevent the cutting insert from exiting the insert pocket and limit rotation of the cutting insert around an insert axis (B) of the cutting insert;

wherein:

a back surface of the cutting insert is in communication with the conduit such that a fluid present in the conduit is capable of urging the cutting insert from the retracted position to the extended position, without the assistance of a spring.

8. The rotary cutting tool according to claim 7, wherein a holding bore opens out to the peripheral surface and communicates with the insert pocket.

9. The rotary cutting tool according to claim 8, wherein the holding member is located in the holding bore and abuts the cutting insert when the cutting insert is in the extended position.

10. The rotary cutting tool according to claim 7, wherein the cutting insert has an insert axis defining a back to front direction and a plane including the insert axis passes therethrough, the cutting insert comprising:

a body portion having a back surface at a back end of the body portion, and a cutting portion at a front end of the body portion, the cutting portion having two cutting edges being reflection symmetric with respect to the plane.

11. The rotary cutting tool according to claim 7, wherein the rotary cutting tool is a drill.

12. A method of drilling a hole in a workpiece comprising:
providing a drill having longitudinal axis of rotation and comprising:

a conduit, for passage of fluid, formed in the drill, the conduit extending generally axially, an insert pocket opening out to a peripheral surface of the drill via an aperture, the insert pocket communicating with the conduit, a cutting insert slidably retained in the insert pocket, the cutting insert being slidable from a retracted position to an extended position in which at least a portion of the cutting insert protrudes from the aperture beyond the peripheral surface of the cutting tool; and a threaded holding member configured to prevent the cutting insert from exiting the insert pocket and limit rotation of the cutting insert around an insert axis (B) of the cutting insert; wherein:

a back surface of the cutting insert is in communication with the conduit such that a fluid present in the conduit is capable of urging the cutting insert from the retracted position to the extended position, without the assistance of a spring; and forming a hole in the workpiece with the drill while passing fluid through said conduit such that said fluid applies pressure to the back surface of the cutting insert and causes the cutting insert to slide towards the extended position.

13. The method according to claim 12, wherein said fluid exits the drill through a minor portion of the conduit that extends outwardly, thereby cooling the workpiece.

* * * * *